US00RE37672E

(19) United States
(12) Reissued Patent
Bell et al.

(10) Patent Number: US RE37,672 E
(45) Date of Reissued Patent: Apr. 30, 2002

(54) CANDLE WITH BUBBLES

(75) Inventors: Jeffrey Bell, Bloomsbury; Stuart A. Zlotnik, Montville, both of NJ (US)

(73) Assignee: Aromatic Technologies, Inc., Somerville, NJ (US)

(21) Appl. No.: 29/115,609

(22) Filed: Dec. 8, 1999

Related U.S. Patent Documents

Reissue of:
(64) Patent No.: Des. 387,446
Issued: Dec. 9, 1997
Appl. No.: 29/062,383
Filed: Nov. 4, 1996

(51) LOC (6) Cl. ..... 26-04
(52) U.S. Cl. ..... D26/6
(58) Field of Search ..... D26/6, 7, 9, 16; D7/523, 524, 533, 536, 301; 431/125, 288–292

(56) References Cited

U.S. PATENT DOCUMENTS

| | | | | | |
|---|---|---|---|---|---|
| 2,584,563 | A | * | 2/1952 | Duncan | 431/125 |
| 3,434,789 | A | * | 3/1969 | Haller | D26/16 |
| 3,790,332 | A | * | 2/1974 | Woollard | 431/291 |
| D231,135 | S | * | 4/1974 | Marcum | D26/7 |
| 4,035,138 | A | * | 7/1977 | Walters | 431/125 |
| 4,110,066 | A | * | 8/1978 | Murphy | 431/125 |
| D290,208 | S | * | 6/1987 | Hlava et al. | D7/523 |
| D371,713 | S | * | 7/1996 | Credle | D7/301 |

OTHER PUBLICATIONS

Emkay Candle Wonderland, Item #605 Christmas Toddy Mug, page 5, Mar. 1968.*

American Candle Co. Inc., #WS–299 Beer Stein Lite–S-cented, Aug. 1966.*

Monongah Glass Co., #5247, Saucer Champagne, page 113, Apr. 1920.*

Monongah Glass Co., #7806 Confection Stand, page 257, Apr. 1920.*

Monongh Glass Co., #8902 Tumbler, page 172, Apr. 1920.*

Sales tag from "Clearfire De–Lite" candle product (from "Candle–lite, Lancaster Colony Company," Cincinnati, OH 45242) (1995).*

* cited by examiner

*Primary Examiner*—Robin V. Taylor
(74) *Attorney, Agent, or Firm*—Reed Smith LLP

(57) CLAIM

The ornamental design for a candle with bubbles, as shown and described.

DESCRIPTION

FIG. 1 is a perspective view of a first embodiment of a candle with bubbles showing our new design, wherein the candle simulates the appearance of a carbonated beverage in a drinking vessel;

FIG. 2 is a side elevational view of the candle with bubbles shown in FIG. 1, the other sides being identical;

FIG. 3 is a top plan view of the candle with bubbles shown in FIG. 1;

FIG. 4 is a bottom plan view of the candle with bubbles shown in FIG. 1;

FIG. 5 is a perspective view of a further embodiment of a candle with bubbles showing our new design, wherein the candle simulates the appearance of a carbonated beverage in a drinking vessel;

FIG. 6 is a side elevational view of the candle with bubbles shown in FIG. 5, the other sides being identical;

FIG. 7 is a top plan view of the candle with bubbles shown in FIG. 5;

FIG. 8 is a bottom plan view of the candle with bubbles shown in FIG. 5;

FIG. 9 is a perspective view of a further embodiment of a candle with bubbles showing our new design, wherein the candle simulates the appearance of a carbonated beverage in a drinking vessel;

FIG. 10 is a side elevational view of the candle with bubbles shown in FIG. 9, the other sides being identical;

FIG. 11 is a top plan view of the candle with bubbles shown in FIG. 9;

FIG. 12 is a bottom plan view of the candle with bubbles shown in FIG. 9;

FIG. 13 is a perspective view of a further embodiment of a candle with bubbles showing our new design, wherein the candle simulates the appearance of a carbonated beverage in a drinking vessel;

FIG. 14 is a side elevational view of the candle with bubbles shown in FIG. 13, the other sides being identical;

FIG. 15 is a top plan view of the candle with bubbles shown in FIG. 13;

FIG. 16 is a bottom plan view of the candle within bubbles shown in FIG. 13;

FIG. 17 is a perspective view of a further embodiment of a candle with bubbles showing our new design, wherein the candle simulates the appearance of a carbonated beverage in a drinking vessel;

FIG. 18 is a side elevational view of the candle with bubbles shown in FIG. 17, the other sides being identical;

FIG. 19 is a top plan view of the candle with bubbles shown in FIG. 17;

FIG. 20 is a bottom plan view of the candle with bubbles shown in FIG. 17;

FIG. 21 is a perspective view of a further embodiment of a candle with bubbles showing our new design, wherein the candle simulates the appearance of a carbonated beverage in a drinking vessel;

FIG. 22 is a side elevational view of the candle with bubbles shown in FIG. 21, the other sides being identical;

FIG. 23 is a top plan view of the candle with bubbles shown in FIG. 21;

FIG. 24 is a bottom plan view of the candle with bubbles shown in FIG. 21;

FIG. 25 is a perspective view of a further embodiment of a candle with bubbles showing our new design, wherein the candle simulates the appearance of a carbonated beverage in a drinking vessel;

FIG. 26 is a side elevational view of the candle with bubbles shown in FIG. 25, the other side being a mirror image;

FIG. 27 is a top plan view of the candle with bubbles shown in FIG. 25;

FIG. 28 is a bottom plan view of the candle with bubbles shown in FIG. 25;

FIG. 29 is a perspective view of a further embodiment of a candle with bubbles showing our new design, wherein the candle simulates the appearance of a carbonated beverage in a drinking vessel;

FIG. 30 is a side elevational view of the candle with bubbles shown in FIG. 29, the other side being a mirror image;

FIG. 31 is a top plan view of the candle with bubbles shown in FIG. 29; and, FIG. 32 is a bottom plan view of the candle with bubbles shown in FIG. 29.

*The broken lines showing in FIGS. 1–32 are for illustrative purposes and form no part of the claimed design.*

1 Claim, 24 Drawing Sheets

---

Matter enclosed in heavy brackets [ ] appears in the original patent, but forms no part of this reissue; matter printed in italics indicates the additions made by reissue.

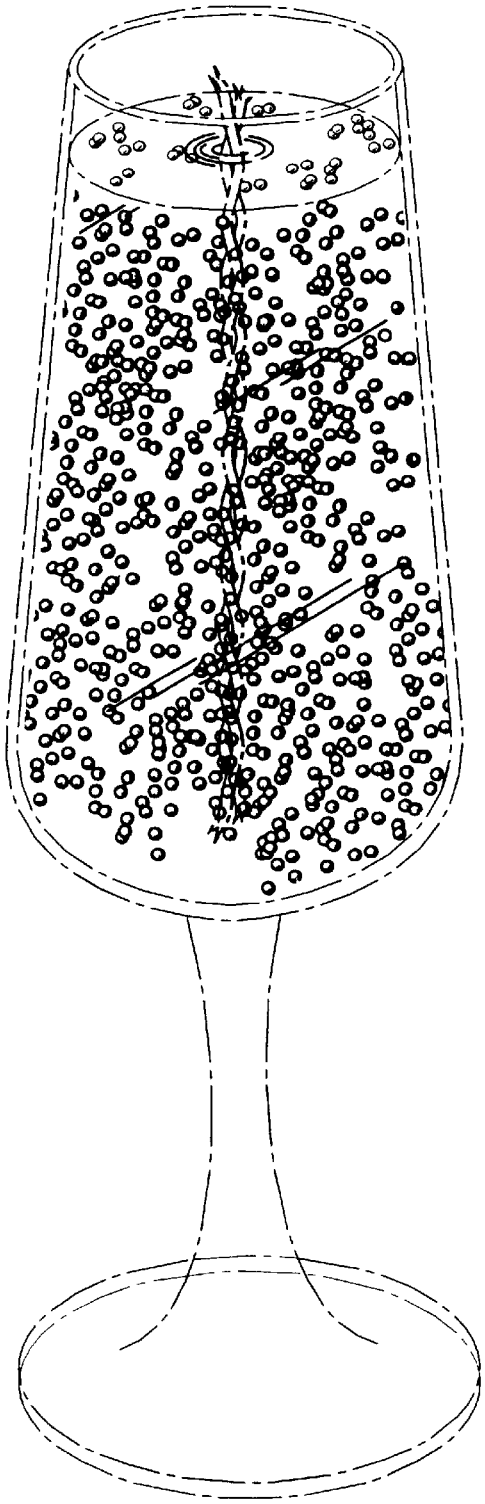
FIG. 1 (Amended)

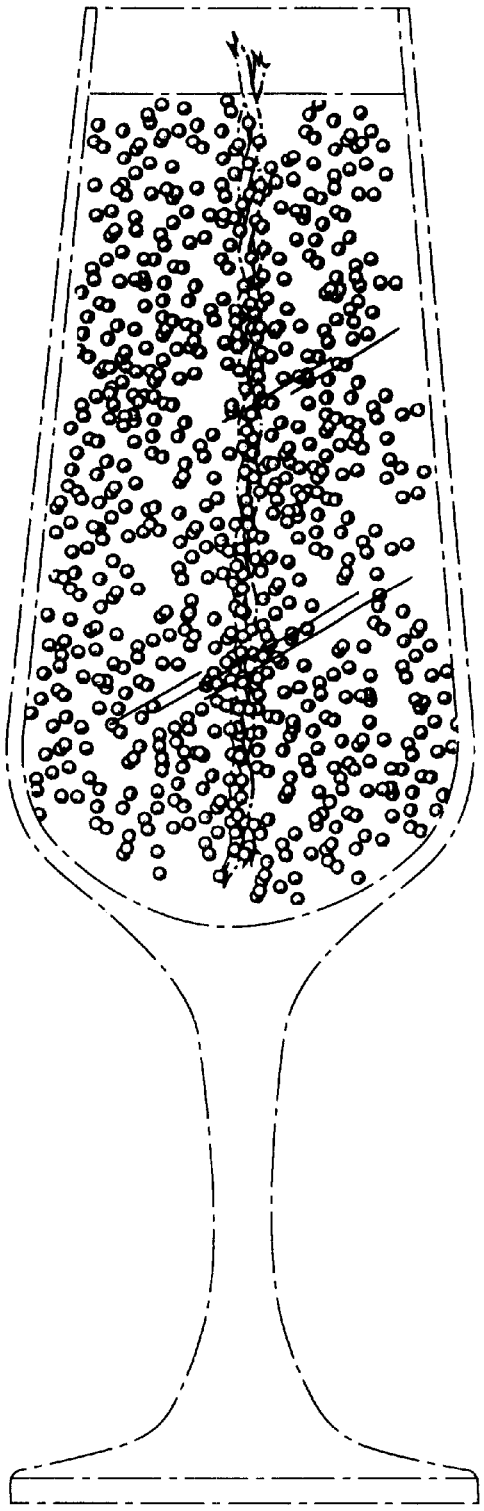
FIG. 2 (Amended)

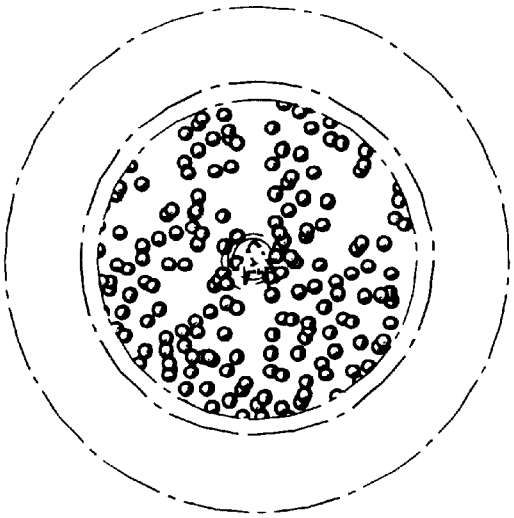
FIG. 3
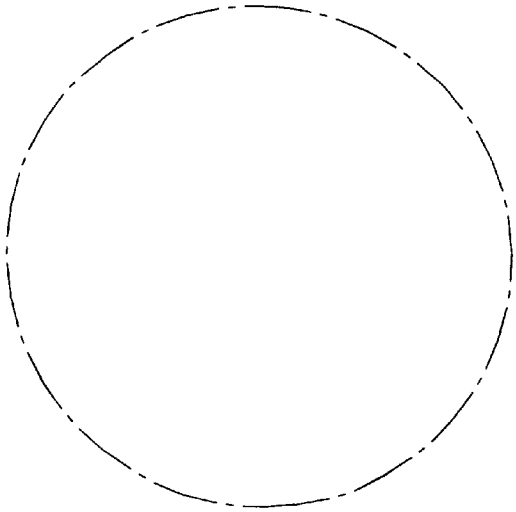
FIG. 4 (Amended)

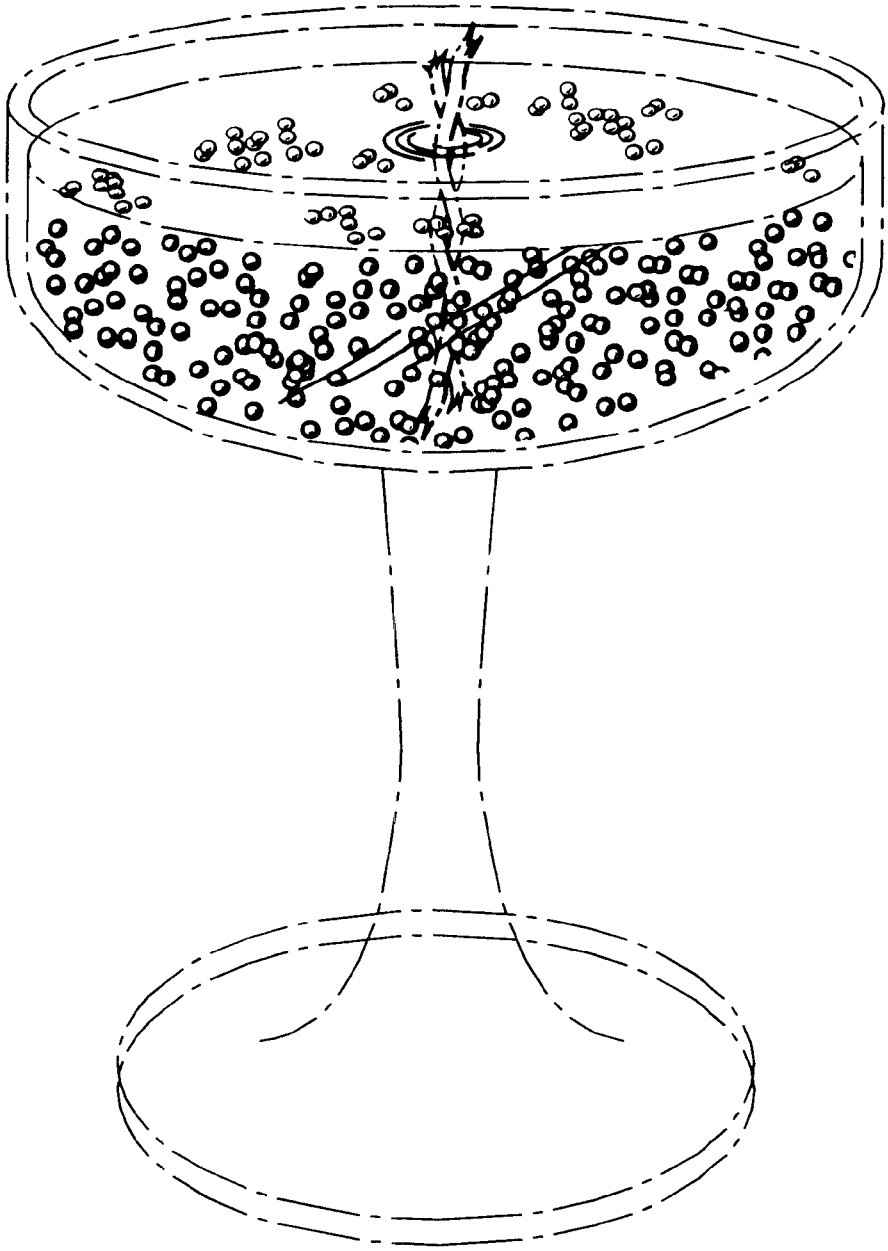
FIG. 5 (Amended)

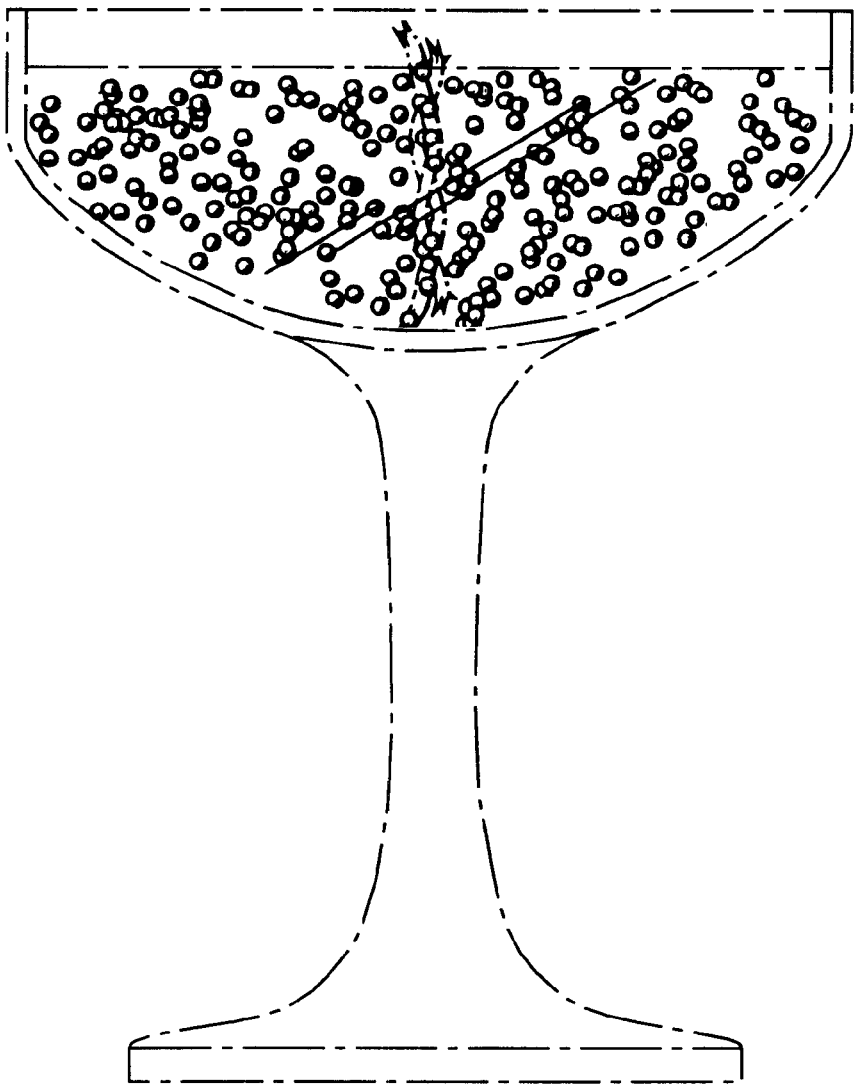
FIG. 6 (Amended)

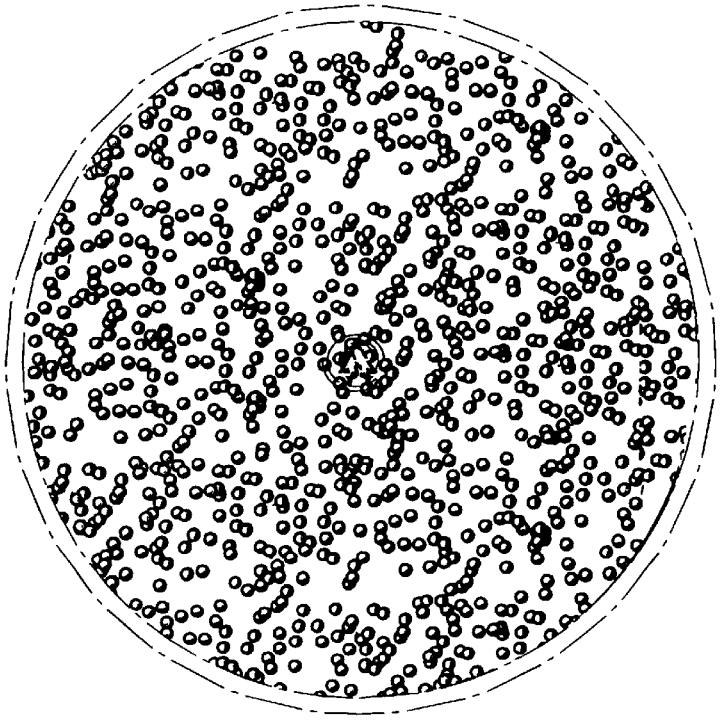
FIG. 7 (Amended)
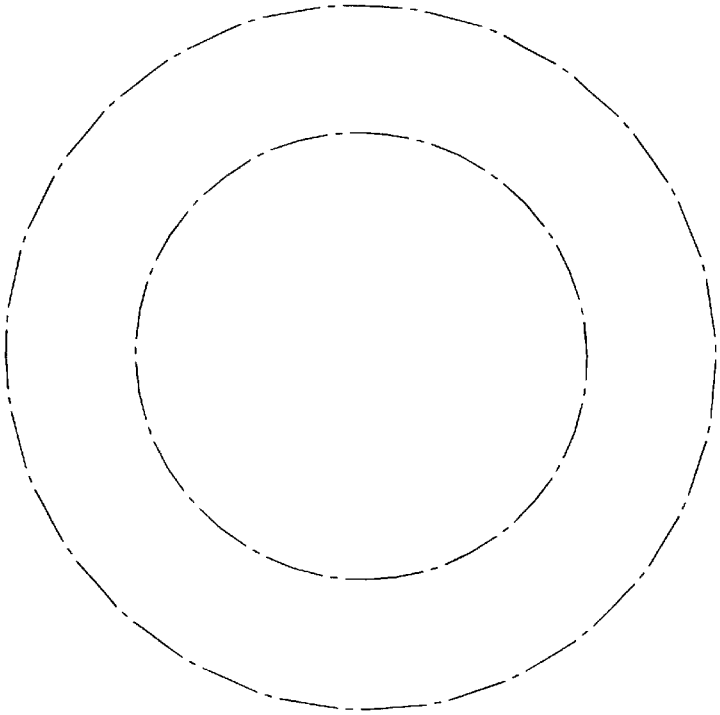
FIG. 8 (Amended)

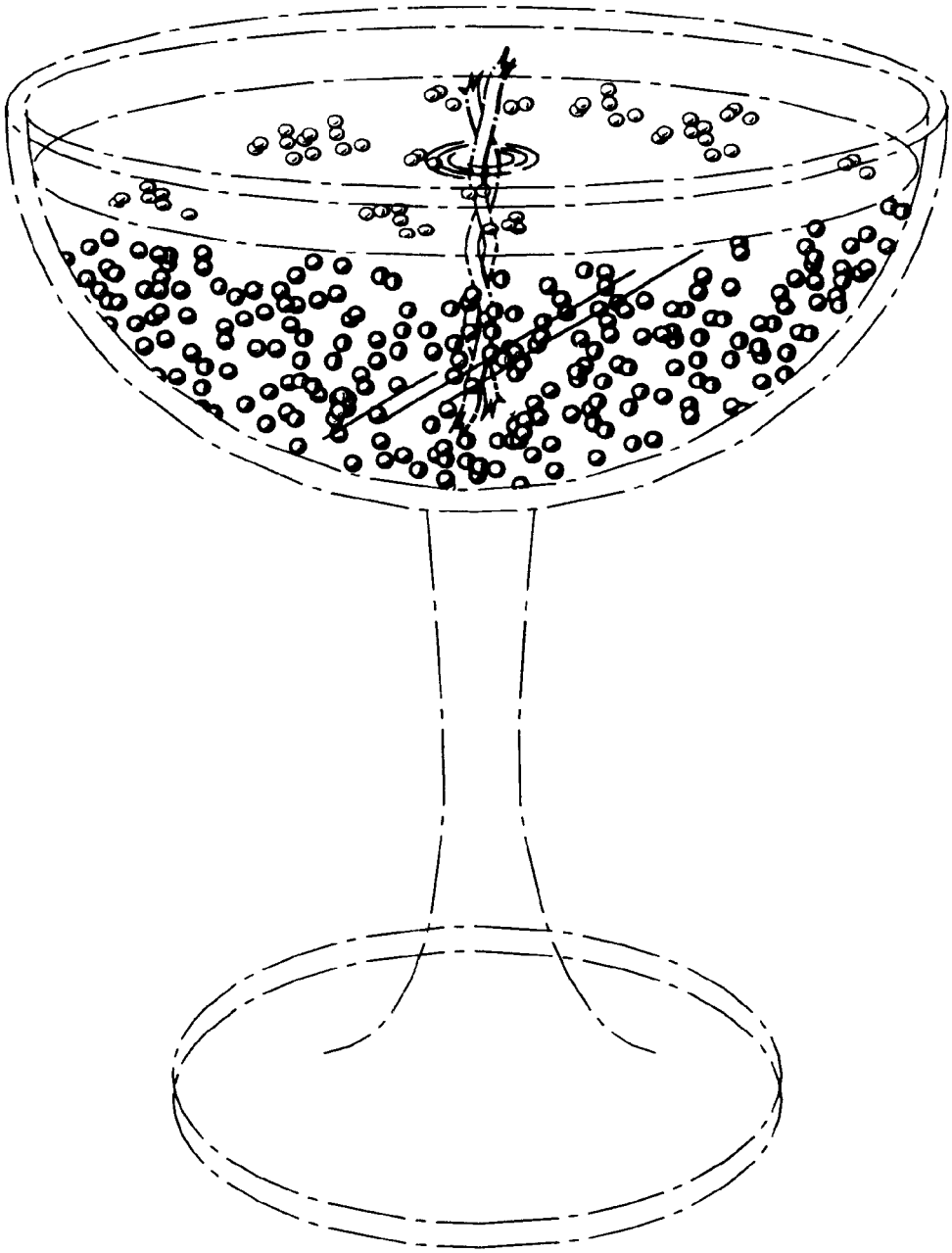
FIG. 9 (Amended)

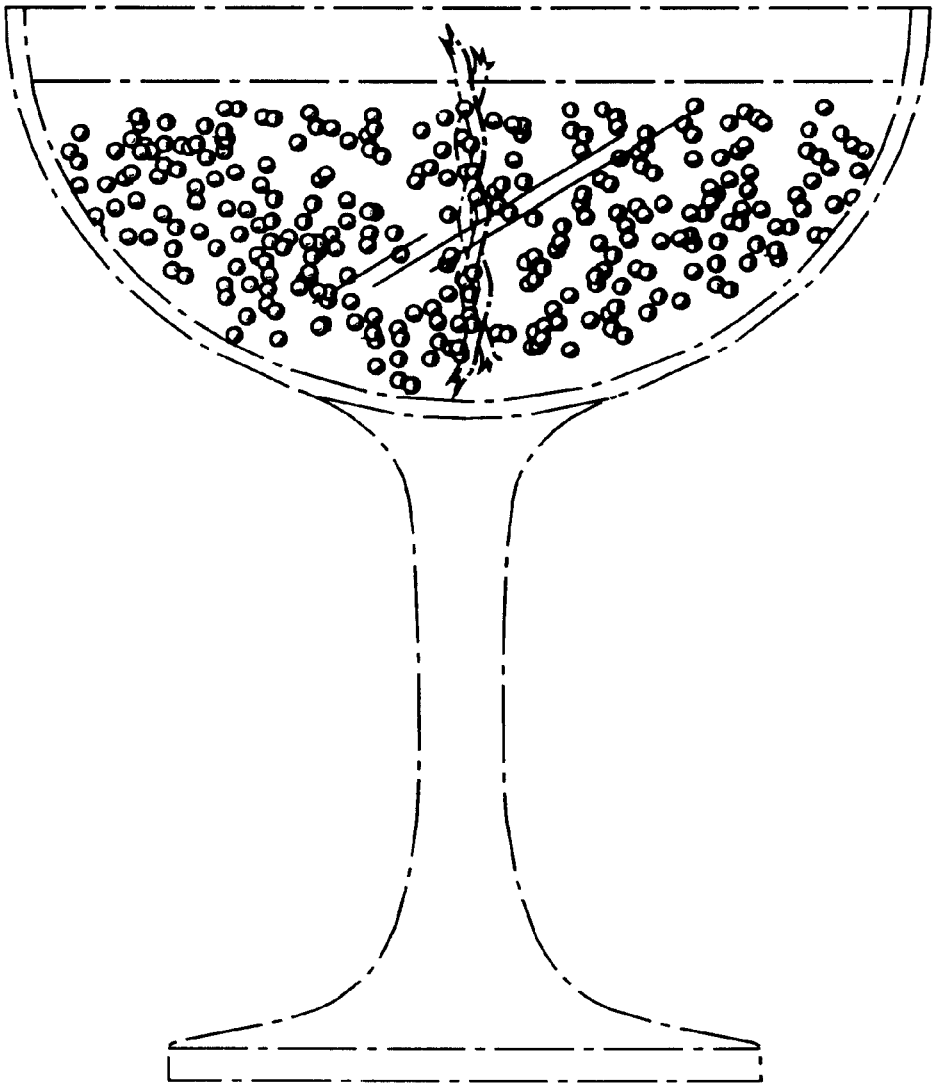
FIG. 10 (Amended)

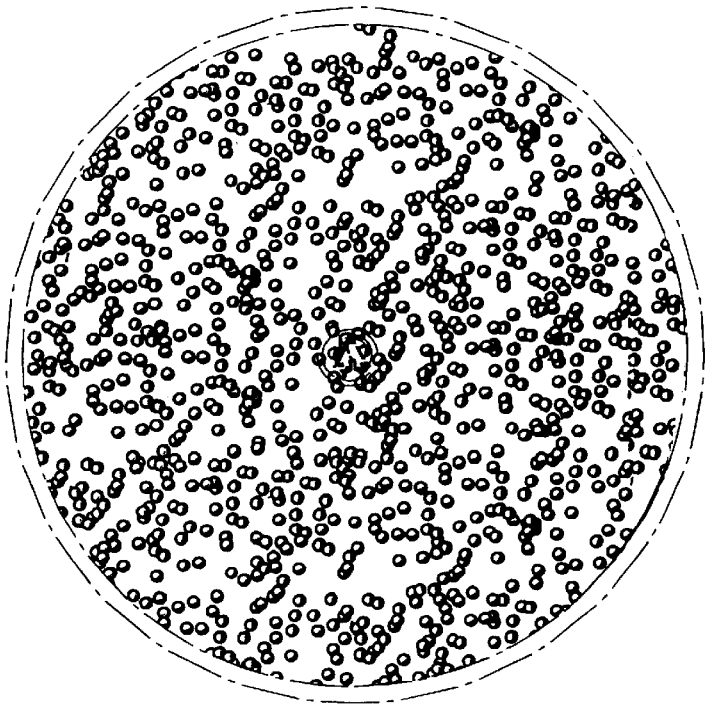
FIG. 11 (Amended)
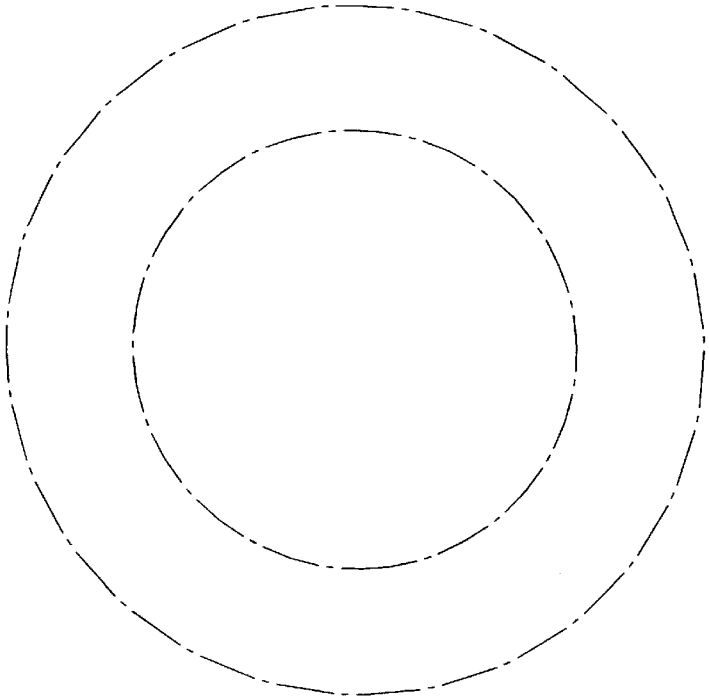
FIG. 12 (Amended)

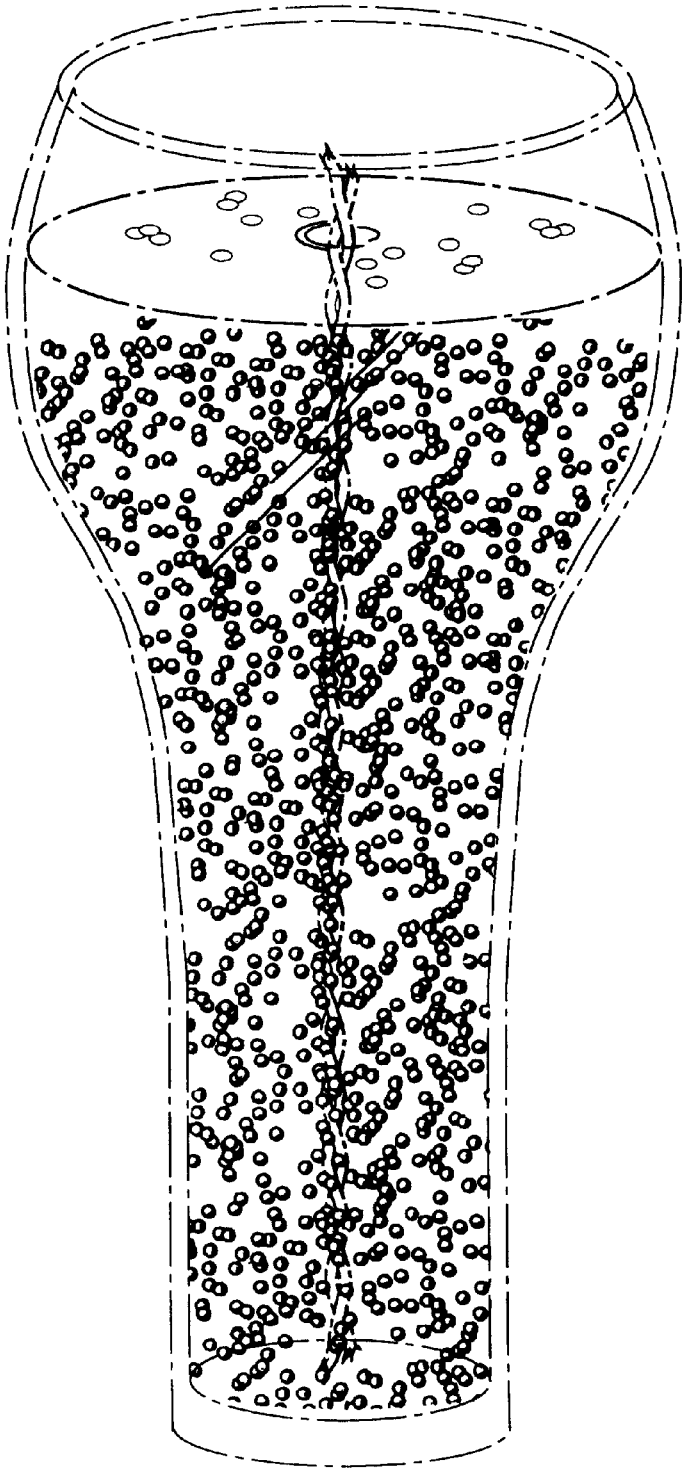
FIG. 13 (Amended)

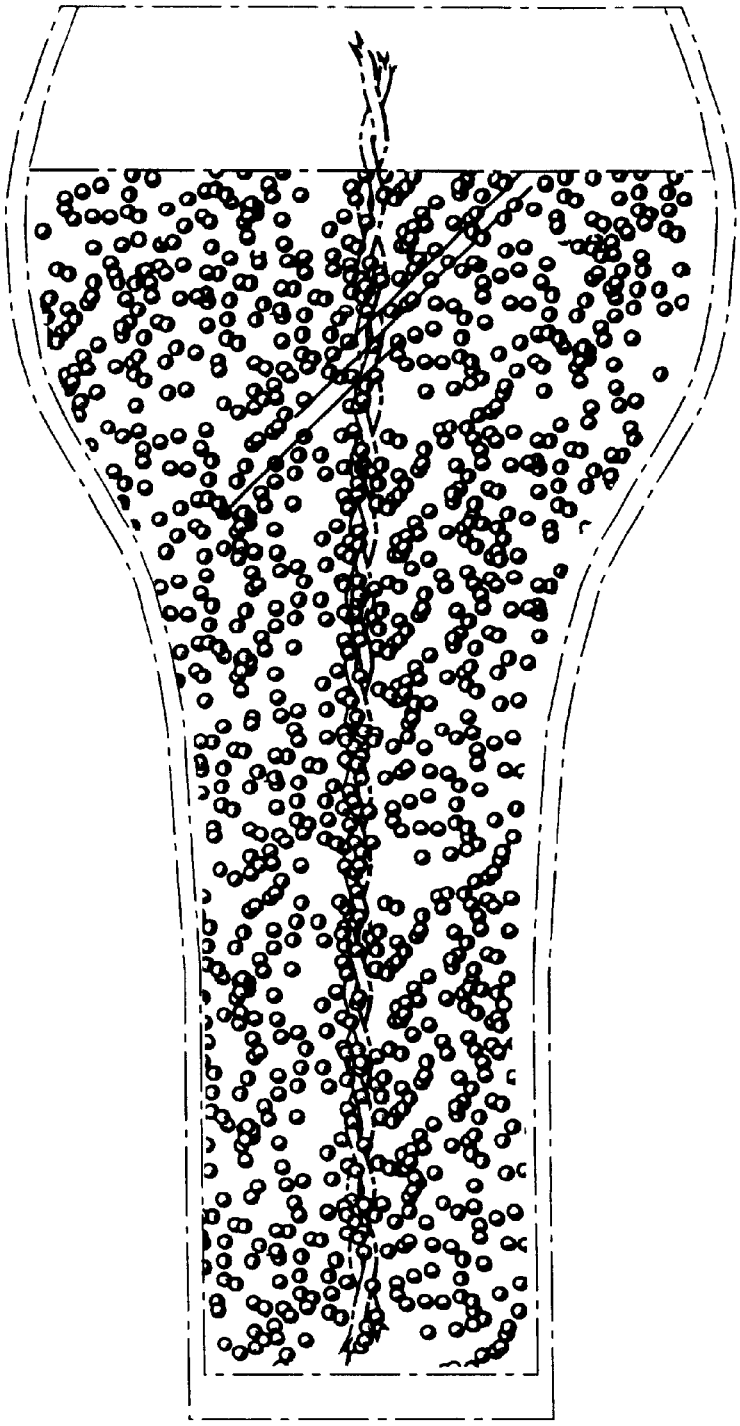
FIG. 14 (Amended)

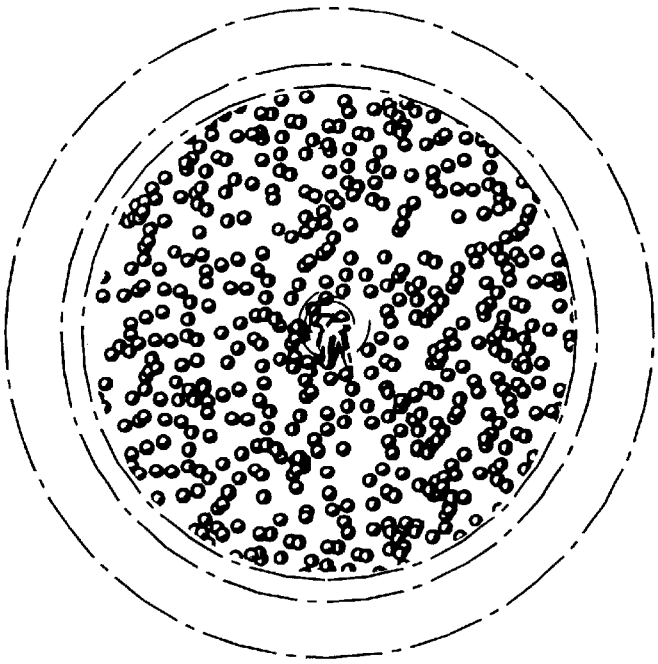
FIG.15 (Amended)
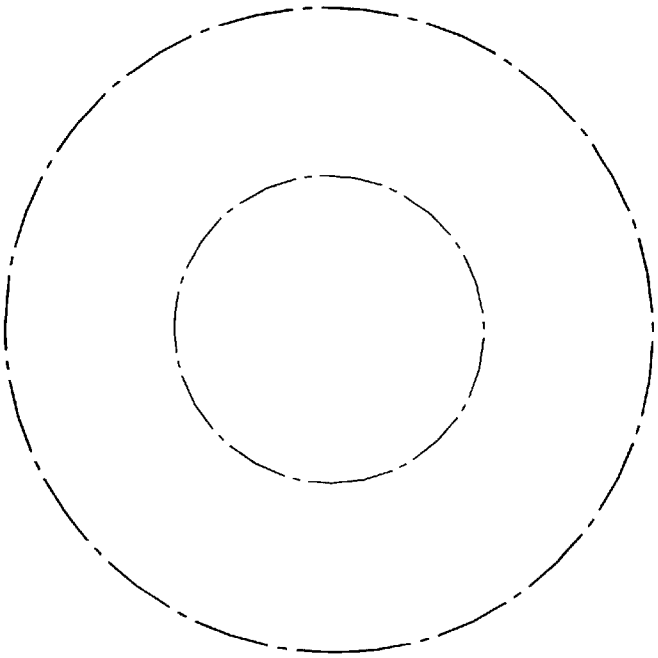
FIG.16 (Amended)

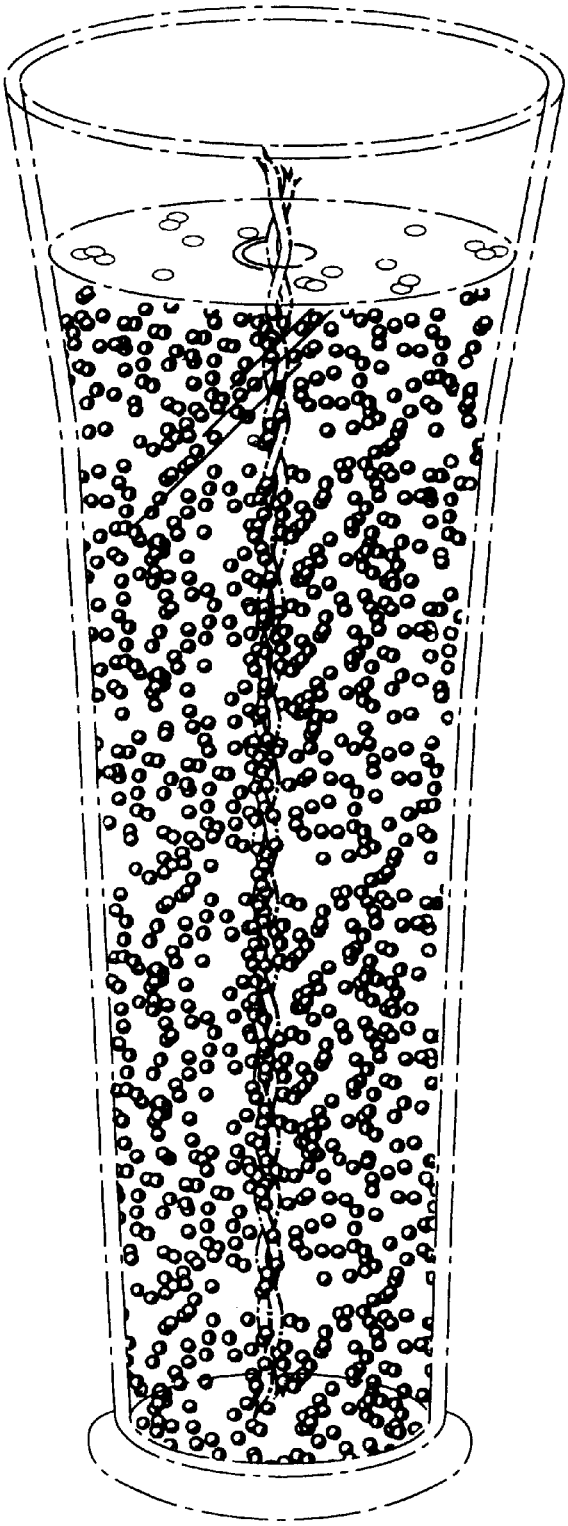
FIG. 17 (Amended)

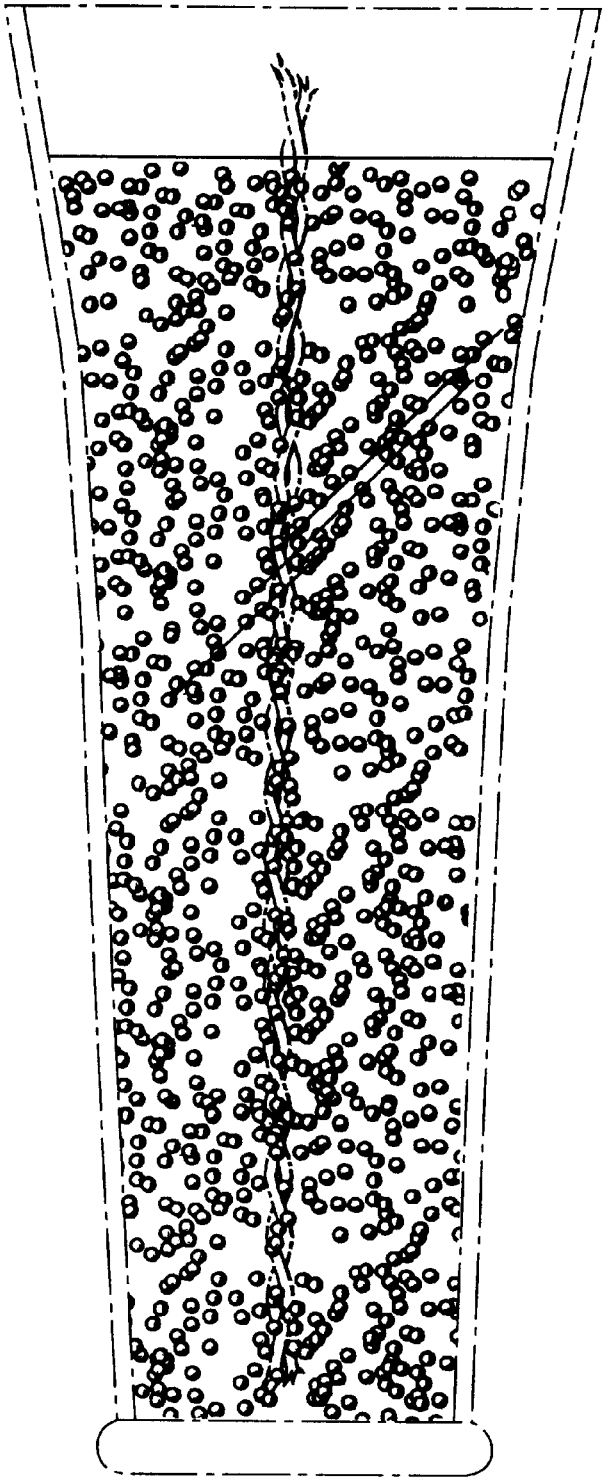
FIG. 18 (Amended)

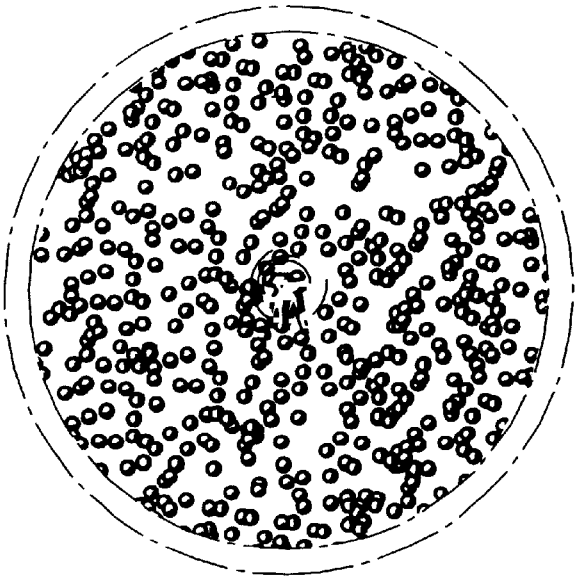
FIG. 19 (Amended)
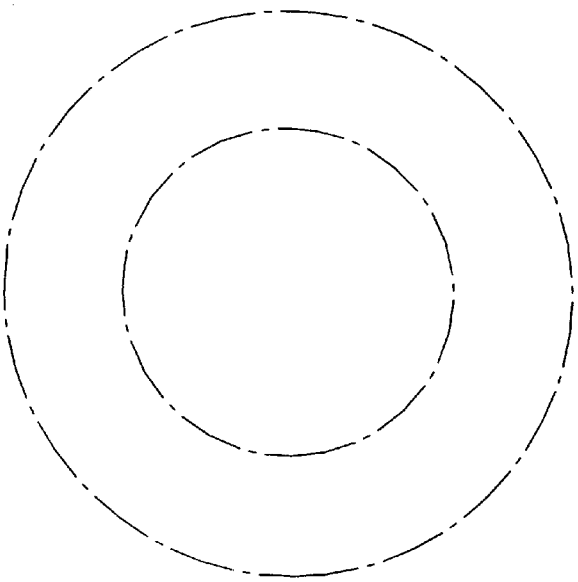
FIG. 20 (Amended)

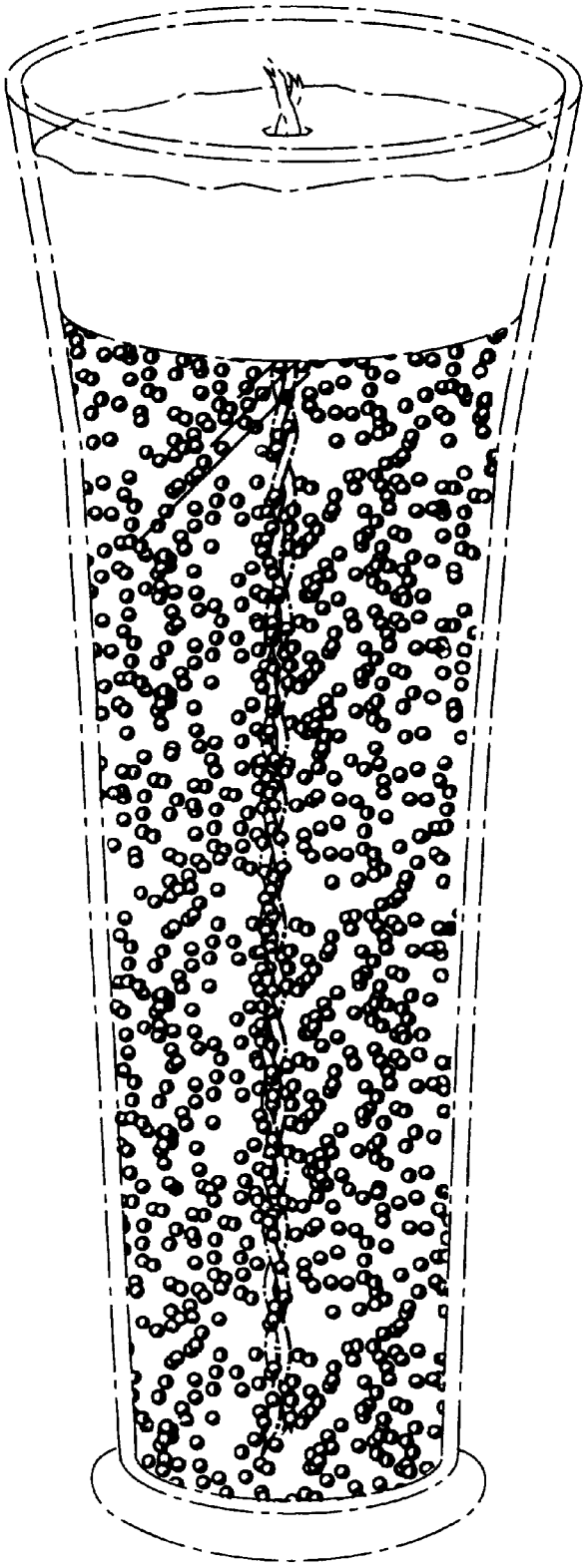
FIG. 21 (Amended)

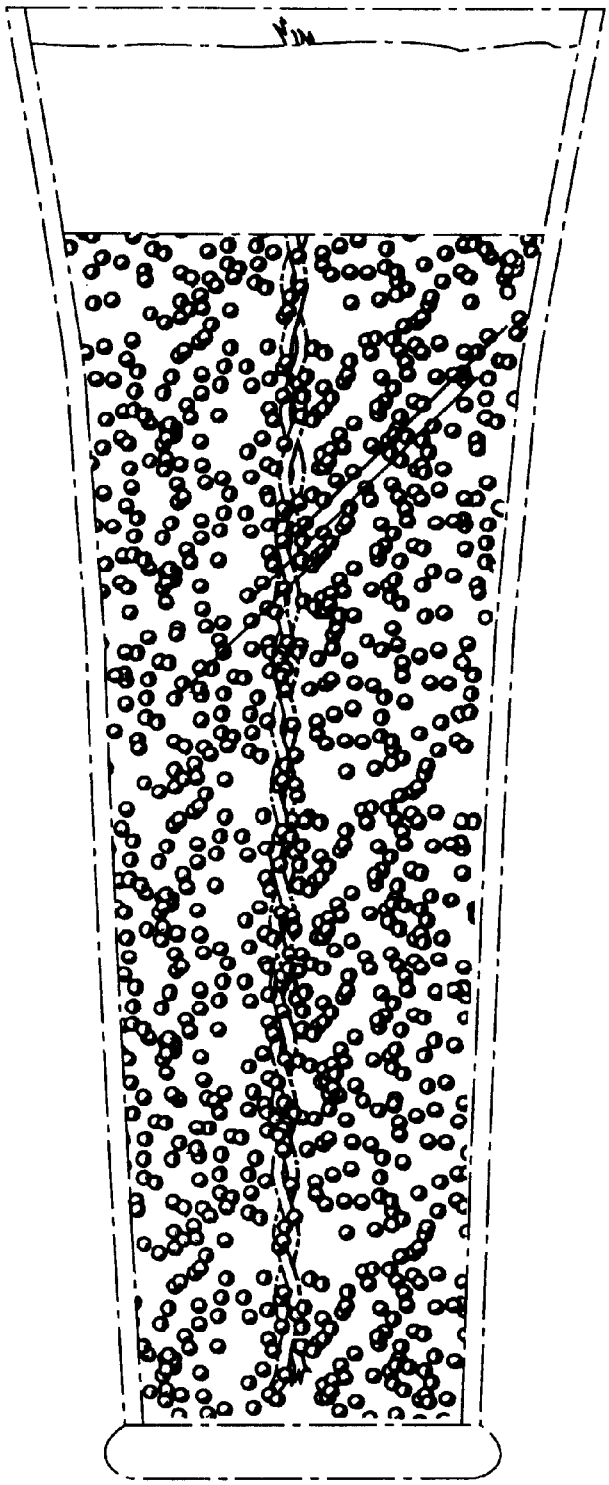
FIG. 22 (Amended)

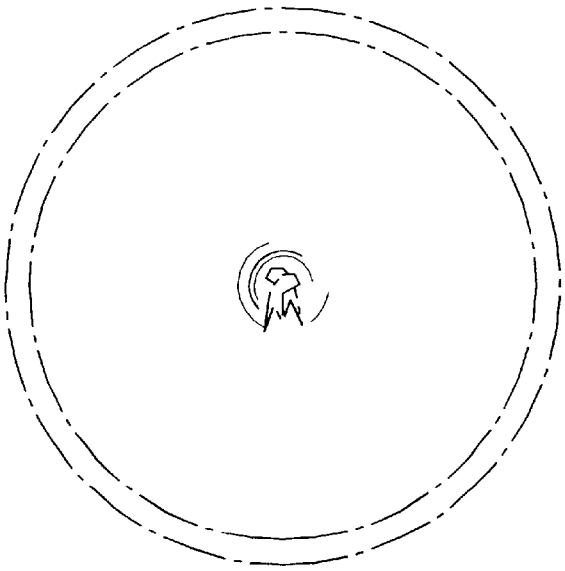
FIG. 23 (Amended)
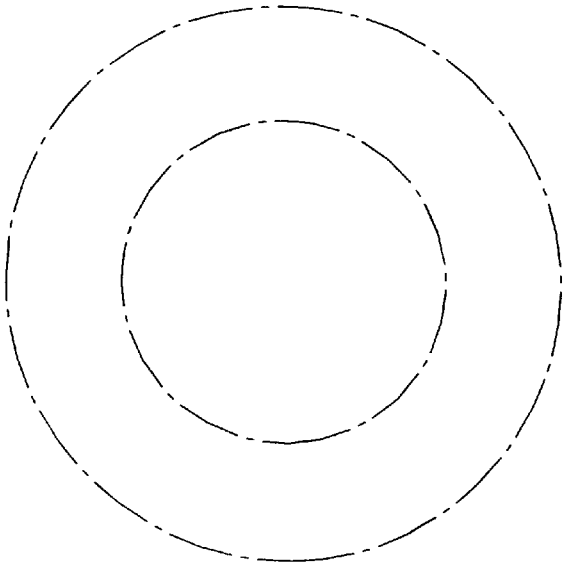
FIG. 24 (Amended)

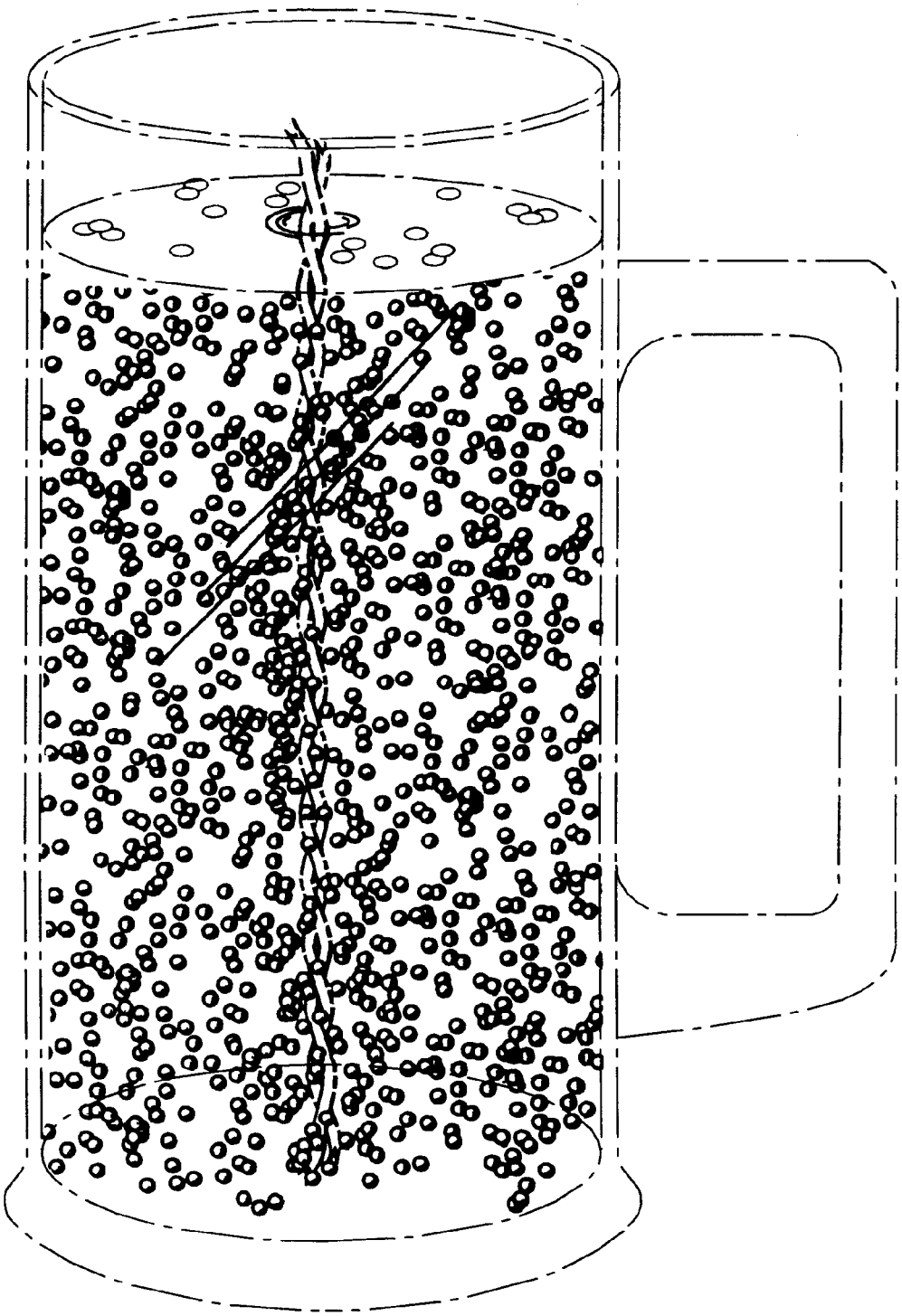
FIG. 25 (Amended)

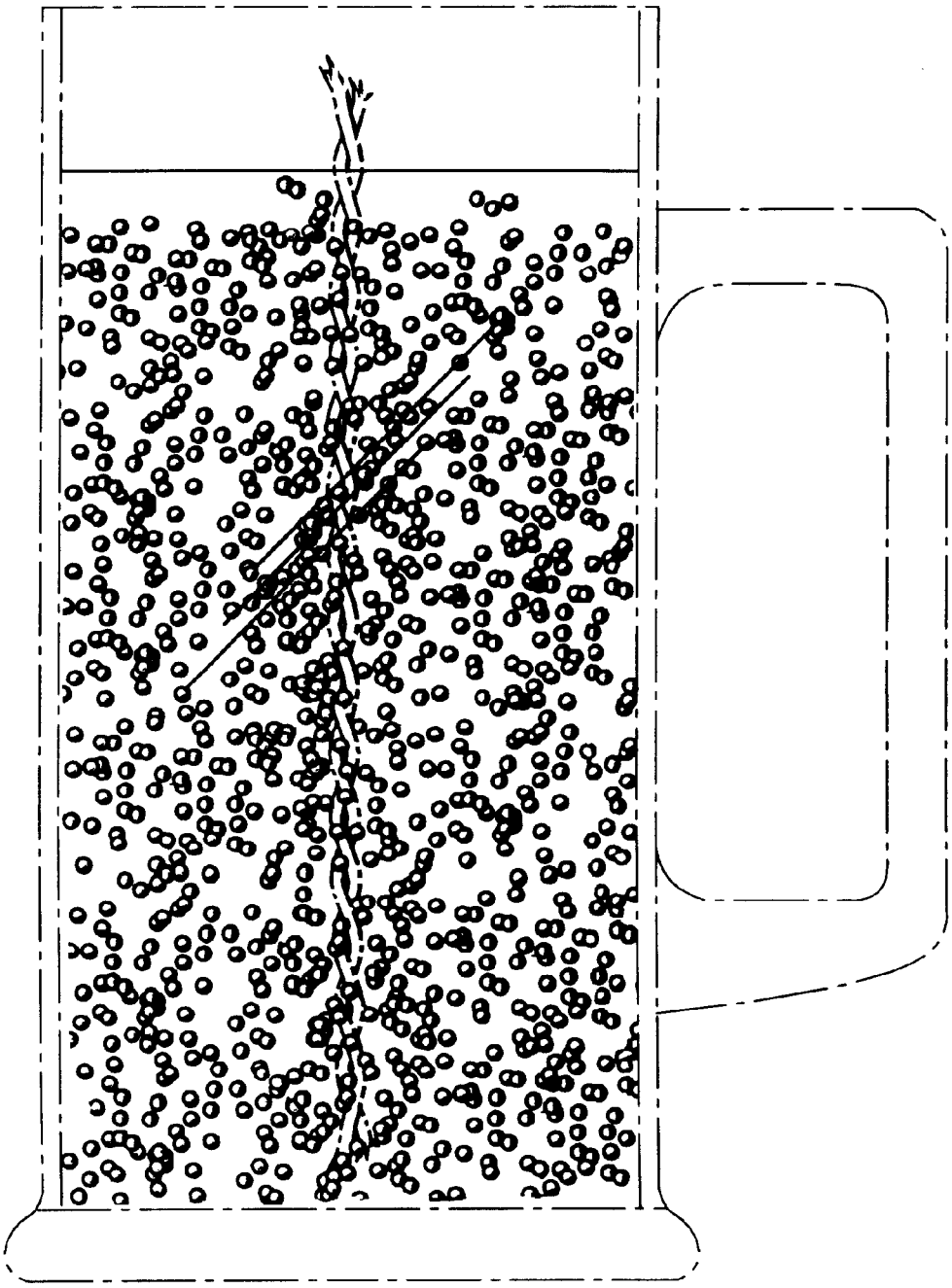
FIG. 26 (Amended)

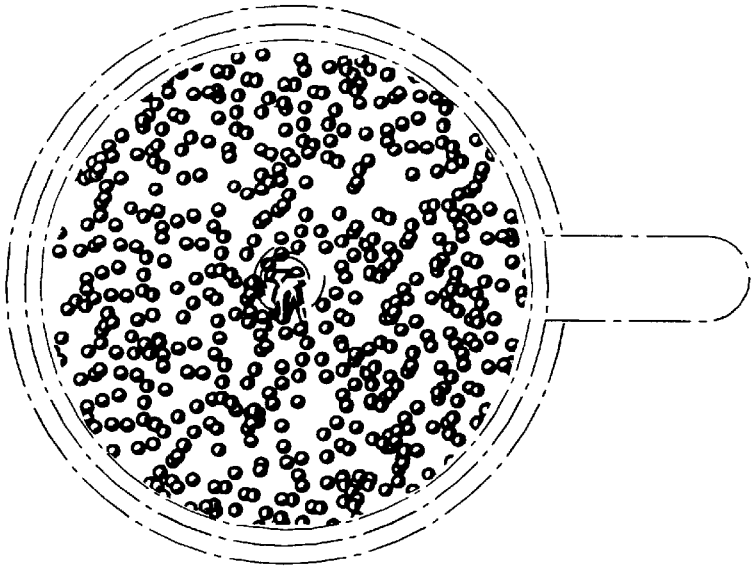
FIG. 27 (Amended)
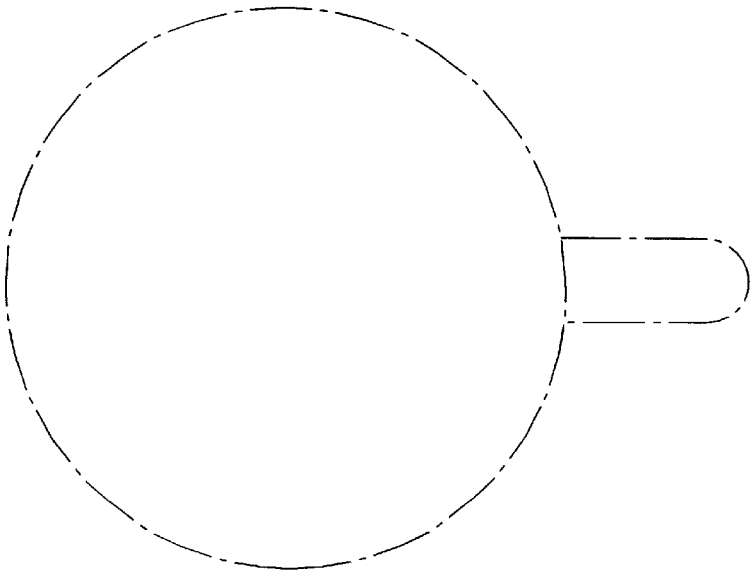
FIG. 28 (Amended)

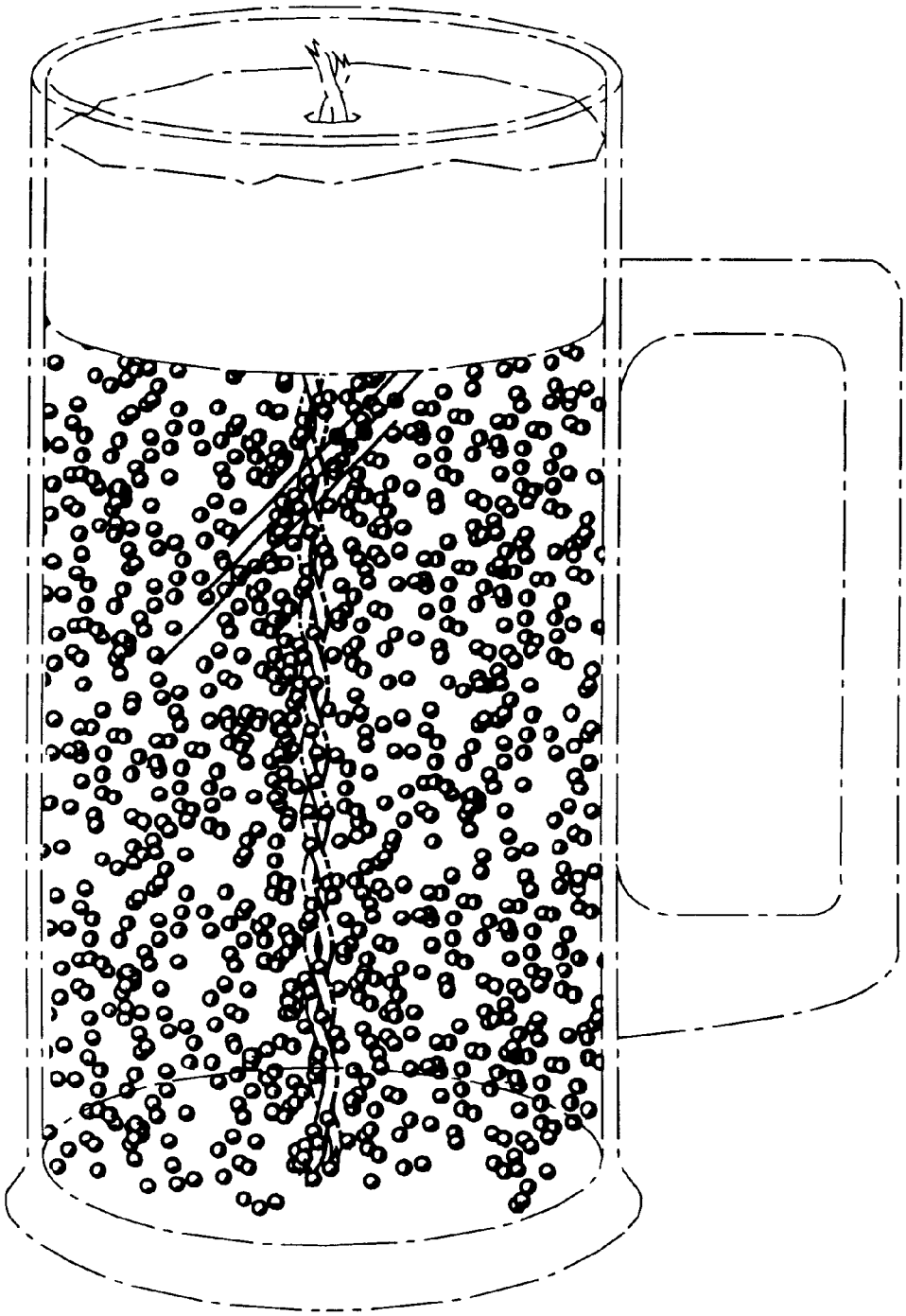
FIG. 29 (Amended)

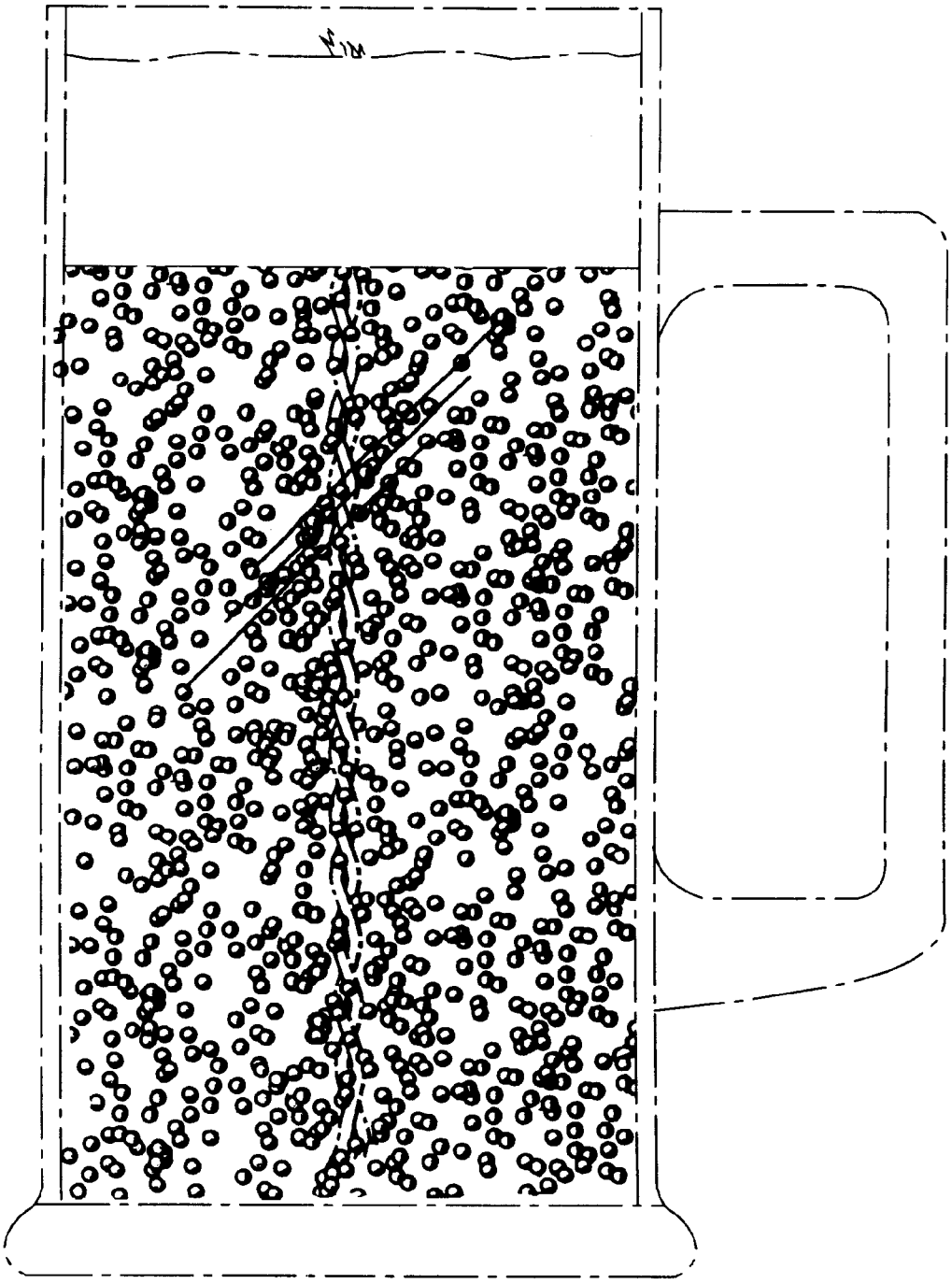
FIG. 30 (Amended)

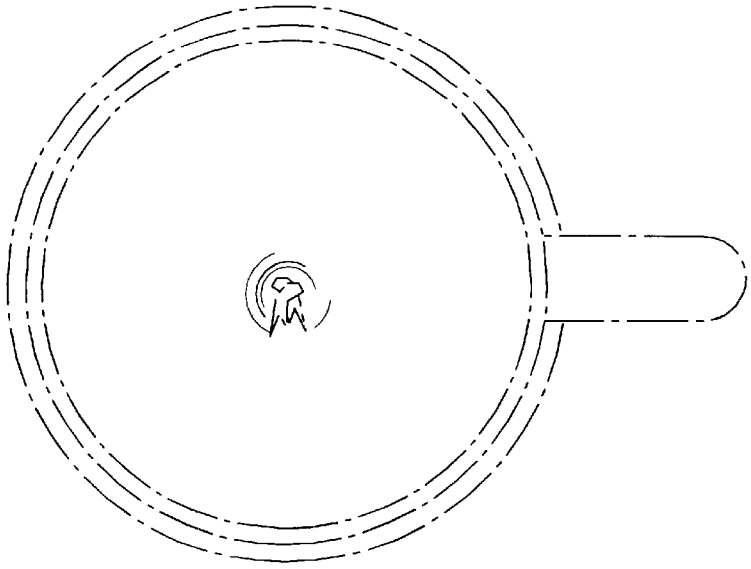
FIG. 31 (Amended)
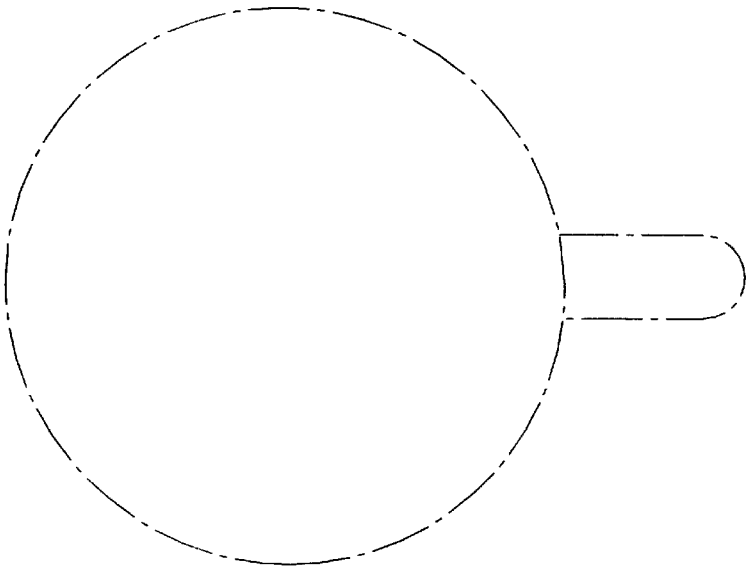
FIG. 32 (Amended)